United States Patent Office 3,215,929
Patented Nov. 2, 1965

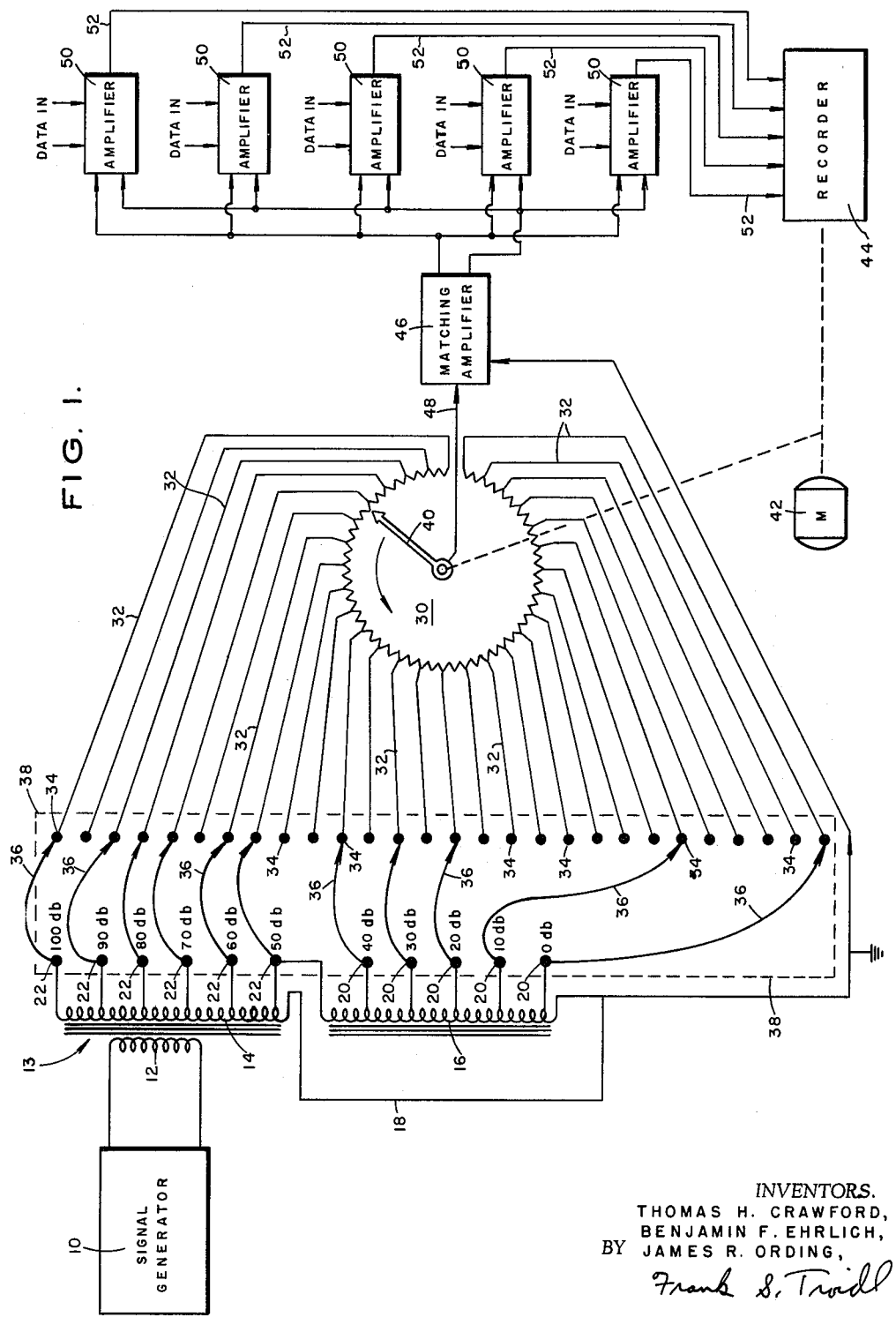

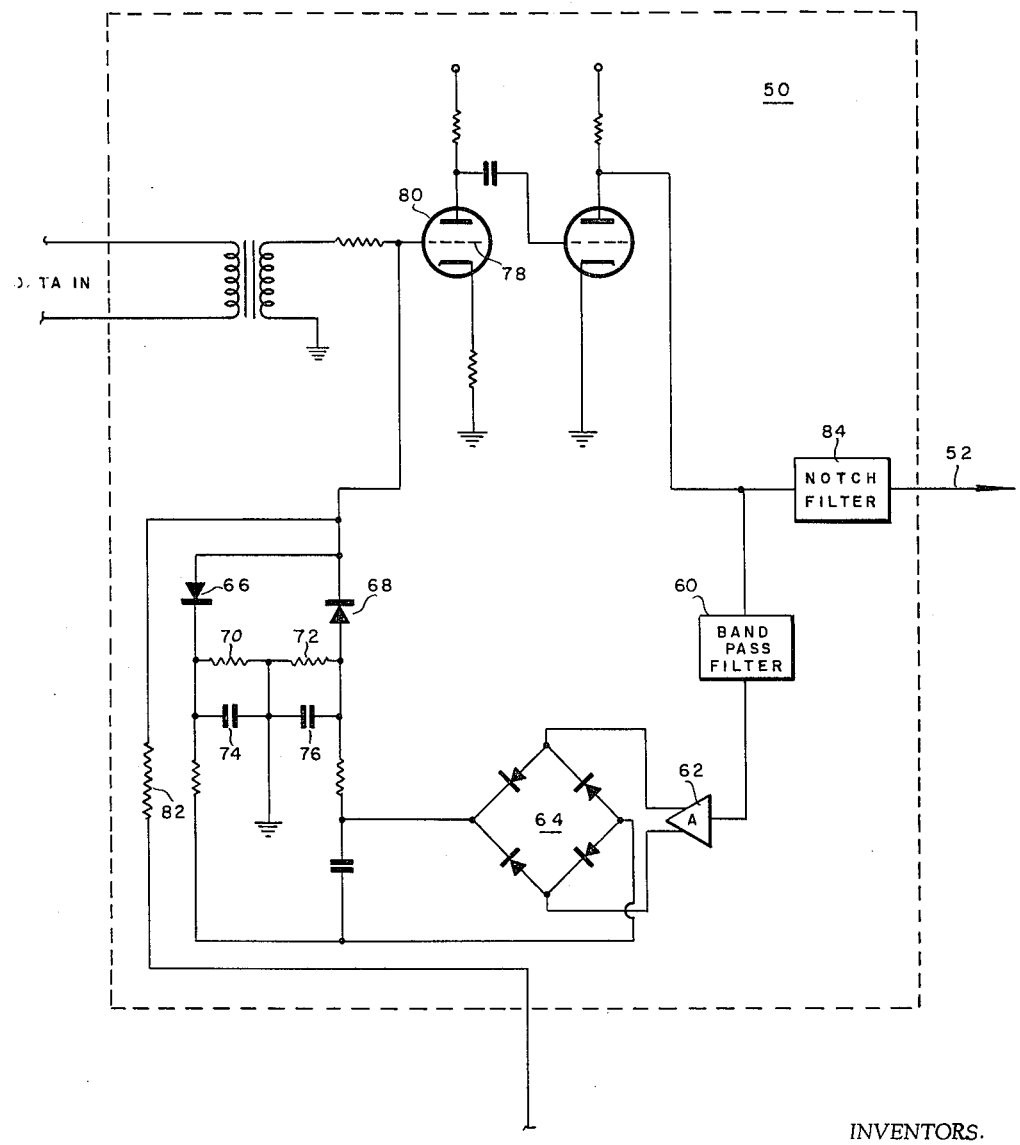

3,215,929
FUNCTION GENERATOR
Thomas H. Crawford, Benjamin F. Ehrlich, and James R. Ording, Houston, Tex., assignors, by mesne assignments, to Esso Production Research Company, Houston, Tex., a corporation of Delaware
Filed Oct. 26, 1962, Ser. No. 233,277
2 Claims. (Cl. 323—43.5)

This invention is a new and improved function generator.

For certain applications, it is highly desirable that a function generator be provided which generates a voltage having a wide decibel range. For example, it is often desirable to provide functions ranging from 0 db to 100 db or more.

With currently utilized function generators, many resistors are connected across a voltage source such as an oscillator. Additional resistors are connected into the circuit as a function of time to attenuate the generated signal. If a wide decibel range is required, the function generator is unduly complicated; and the power requirements of function generators are exceptionally high.

The invention to be described herein is a relatively simple function generator having relatively few parts and a wide decibel range exceeding a range of from 0 db to 100 db.

A more particular inventive concept disclosed herein is the use of the new and improved function generator in combination with apparatus for recording seismic data. In seismic exploration, seismic signals are artifically generated from the earth's surface. Some of the energy of the seismic signals is reflected by subsurface boundaries and detected by geophones located at the earth's surface. The geophones generate electrical signals corresponding in amplitudes and frequencies to the detected seismic signals. These signals are recorded.

The amplitudes of the seismic signals, in general, decrease as a function of time. The function generator to be described herein, when used in combination with the seismic recording apparatus, uniquely provides for continuously increasing the gain of the seismic amplifiers to provide a usuable recorded signal.

The invention, as well as its many advantages, will be further understood by reference to the following detailed description and drawings in which:

FIG. 1 is an electrical, schematic diagram showing the function generator as used with seismic recording apparatus; and FIG. 2 is an electrical, schematic diagram showing in more detail the internal structure of each of the seismic amplifiers shown in FIG. 1.

Referring to the drawings and more particularly to FIG. 1, the new function generator includes a signal generator 10 which feeds a voltage to the primary coil 12 of an iron core transformer 13.

A master secondary coil 14 and a slave secondary coil 16 provide the outputs of the transformer 13. The lower terminal of secondary coil 14 is connected to the lower terminal of secondary coil 16 through conducting line 18.

The number of turns in each of the secondary coils 14 and 16 per unit of distance increases from the lower terminal to the upper terminal. This increasing number of turns per unit of distance from the lower terminal to the upper terminal of each of coils 14 and 16 provides for a very wide range of voltage output from the secondary coils. For example, on coil 16 there is provided a plurality of tap terminals 20 which are equally spaced from one another. Also, a plurality of equally spaced tap terminals 22 is provided along secondary coil 14. The top terminal of secondary coil 16 is connected through the lowermost tap 22 to the lowermost loop of secondary coil 14.

The lowermost tap of secondary coil 14 is connected to the lowermost turn of secondary coil 16. Thereafter, the equally spaced taps provide consecutive increases of 10 db. To provide these consecutive increases of 10 db, there are 3.16 turns from the 0 db tap to the 10 db tap. Similarly, there are 10, 31.6, 100, and 316 turns from the 0 db tap to the 20 db, 30 db, 40 db, and 50 db taps, respectively. Likewise, along coil 14 there are 3.16, 10, 31.6, 100, and 316 turns from the 50 db tap to the 60 db, 70 db, 80 db, 90 db, and 100 db taps, respectively.

A linear potentiometer 30 is provided with a plurality of potentiometer input lines 32. Each of the input lines 32 is provided with an input terminal 34. A plurality of flexible jumpers 36 is provided to feed desired voltages from the secondary coils 14 and 16 to desired input terminals leading to the potentiometer 30. The taps 20 and 22, input terminals 34, and flexible jumpers 36 may form part of a plug-in board indicated by the broken line 38.

The linear potentiometer 30 includes a rotatable potentiometer tap 40. The tap 40 may be continuously rotated by means of a motor 42 which rotates the tap 40 in synchronism with a recorder 44 which may be a rotatable tape recorder.

The voltage from tap 40 is conducted to a matching amplifier 46 through line 48. The output from the matching amplifier 46 is conducted to each of the seismic amplifier 50. Each of the seismic amplifiers 50 also receives seismic data which are amplified and then fed through lines 52 to the recorder 44.

When the function generator is used in combination with the seismic recording apparatus, the seismic data from a particular geophone are fed to a particular amplifier. In general, the amplitudes of the seismic signals decrease as a function of time. In order to obtain usable seismic signals, it is desirable to continuously increase the gain of the seismic amplifiers as a function of time. This is accomplished by providing a continuously decreasing suppression voltage from the potentiometer 30 to each of the amplifiers 50. It is desirable that the frequency of the signals from the function generator be different from the expected frequencies of the seismic signals. It has been found, for example, that a frequency from the function generator of about 3000 c.p.s. works very well since the expected range of seismic signals is from 5 c.p.s. to 200 c.p.s.

As shown in FIG. 2, each of the amplifiers is provided with a feed-back circuit including band-pass filter 60, amplifier 62, rectifier 64, and a losser circuit loop including gain control diodes 66 and 68, bleed resistors 70 and 72, and capacitors 74 and 76.

The output from matching amplifier 46 feeds into the grid 78 of triode 80 through resistor 82. A notch filter 84 is provided in the output line 52. The band-pass filter 60 and notch filter 84 serve to guide and block, respectively, the suppression frequency. Thus, for example, if the suppression voltage frequency is 3000 c.p.s., the band-pass filter 60 passes the 3000 c.p.s. signal; and the notch filter 84 blocks the 3000 c.p.s. signal from the line 52. Hence, the suppression voltage is not recorded on the recorder 44. Only the seismic signals are recorded on recorder 44.

We claim:
1. In combination: a signal generator; a transformer having a primary coil adapted to receive signals from the signal generator, said transformer also having a master secondary coil and a slave secondary coil with the lower terminal of the slave secondary coil being connected to the lower terminal of the master secondary coil and the upper terminal of the slave secondary coil being connected to the lowermost loop of the master secondary coil, the number of turns in each of the secondary coils per unit of distance increasing from the lower terminal to the upper terminal; a plurality of tapping terminals equally spaced along the secondary coils; a linear potentiometer; a plurality of potentiometer input lines; a plurality of flexible jumpers, each having one end connected to one of said plurality of tapping terminals with the other end being adapted to connect with any one of the potentiometer input lines to permit the feeding of voltages from chosen points on the secondary coils to chosen potentiometer input lines; a movable potentiometer tap; a conducting line connected to said movable potentiometer tap; and means for continuously moving the movable potentiometer tap whereby a continuously decreasing voltage may be tapped from the potentiometer.

2. In combination: a signal generator; a transformer having a primary coil adapted to receive signals from the signal generator, said transformer also having a master secondary coil and a slave secondary coil with the lower terminal of the slave secondary coil being connected to the lower terminal of the master secondary coil and the upper terminal of the slave secondary coil being connected to the lowermost loop of the master secondary coil, the number of turns in each of the secondary coils per unit of distance increasing from the lower terminal to the upper terminal; a plurality of tapping terminals on the secondary coils, said tapping terminals being equally spaced in db range along the secondary coils; a linear potentiometer; electrical lines connected to the tapping terminals and connected to the linear potentiometer; a movable potentiometer tap; a conducting line connected to said movable potentiometer tap; and means for continuously moving the movable potentiometer tap whereby a continuously decreasing voltage may be taken from the potentiometer.

References Cited by the Examiner
UNITED STATES PATENTS

| | | | |
|---|---|---|---|
| 2,774,934 | 12/56 | Gitzendanner | 323—43.5 |
| 3,048,817 | 8/62 | Greening | 340—15.5 |
| 3,056,916 | 10/62 | Ansell et al. | 323—43.5 |
| 3,100,864 | 8/63 | Spencer et al. | 325—197 X |
| 3,147,459 | 9/64 | McCarter | 340—15.5 |

LLOYD McCOLLUM, *Primary Examiner.*

SAMUEL FEINBERG, CHESTER L. JUSTUS,
*Examiners.*